(12) United States Patent
McCord et al.

(10) Patent No.: US 7,721,840 B2
(45) Date of Patent: May 25, 2010

(54) CREEP STEERING CONTROL SYSTEM OPERABLE FROM REARWARD-FACING POSITION

(75) Inventors: Christopher T. McCord, Thomson, GA (US); John R. Arthur, Moncure, NC (US); Julian Sanchez, Bettendorf, IA (US); David G. Reid, Grovetown, GA (US)

(73) Assignee: Deere & Company, Moline, IL (US)

( * ) Notice: Subject to any disclaimer, the term of this patent is extended or adjusted under 35 U.S.C. 154(b) by 530 days.

(21) Appl. No.: 11/747,514

(22) Filed: May 11, 2007

(65) Prior Publication Data
US 2008/0277190 A1 Nov. 13, 2008

(51) Int. Cl.
*B60K 17/00* (2006.01)

(52) U.S. Cl. ............... 180/336; 180/321; 180/329; 180/333; 180/334; 180/402

(58) Field of Classification Search ............ 180/329, 180/315, 321, 336, 334, 333, 330, 402, 443
See application file for complete search history.

(56) References Cited

U.S. PATENT DOCUMENTS

| 3,022,850 | A | * | 2/1962 | Bidwell et al. | ............ 180/333 |
| 5,346,035 | A | * | 9/1994 | Ueda et al. | ............ 180/329 |
| 6,851,495 | B2 | * | 2/2005 | Sprinkle et al. | ............ 180/53.2 |

* cited by examiner

*Primary Examiner*—Eric Culbreth

(57) ABSTRACT

A creep steering control system for a utility vehicle is operable from a rearward-facing position. The creep steering control system includes a pivotable actuator alongside a rearward-facing seat that provides electronic output based on the position of the actuator. A linkage is provided between the pivotable actuator and steering wheel behind the seat.

18 Claims, 3 Drawing Sheets

CREEP STEERING CONTROL SYSTEM OPERABLE FROM REARWARD-FACING POSITION

FIELD OF THE INVENTION

The present invention relates to utility vehicles for industrial and agricultural use, such as utility tractors. Particularly, the invention relates to creep steering control systems for utility vehicles.

BACKGROUND

Some utility vehicles, such as the 110 TLB offered by Deere & Company of Moline, Ill., include a creep-to-reposition function allowing an operator on a rearward-facing seat to engage and modulate ground speed while operating a rear-mounted implement such as a backhoe. U.S. Pat. No. 6,851,495 relates to a creep speed control for a utility vehicle that is operable from a rearward-facing seat. The creep speed control includes a mechanical or electronic control arrangement that a rearward-facing operator can use to move the utility vehicle at a controlled ground speed with the transmission in forward or reverse. For example, a rearward-facing operator may operate a creep speed control using a rocker switch to select either forward or reverse, and a thumb lever to control creep ground speed. The rearward-facing operator can use the creep speed control to move the utility vehicle along a trench without leaving the seat or using the backhoe to reposition the vehicle.

While an operator uses the backhoe or another rear-mounted implement from the rearward-facing position on a utility vehicle, he or she also may want to steer the vehicle. Some utility vehicle operators attempts to steer the vehicle while using the creep-to-reposition function. To do this, the operator must reach behind the rearward-facing seat to turn the vehicle's steering wheel, while simultaneously operating the creep speed control. Reaching behind the seat to steer can require uncomfortable movements by the operator, and also can be imprecise and unsafe.

A creep steering control system for a utility vehicle is needed that is operable from a rearward-facing position while using the creep-to-reposition feature. A creep steering control system for a utility vehicle is needed that an operator can use comfortably, precisely, and safely from a rearward-facing position while operating a rear-mounted implement such as a backhoe.

SUMMARY OF THE INVENTION

A creep steering control system for a utility vehicle is provided that may be operated from a rearward-facing position while using a creep-to-reposition feature. The creep steering control system may have a pivotable actuator that can be operated comfortably, precisely and safely from a rearward-facing position while operating a backhoe or other rear-mounted implement.

DESCRIPTION OF PREFERRED EMBODIMENTS

Figure 1:
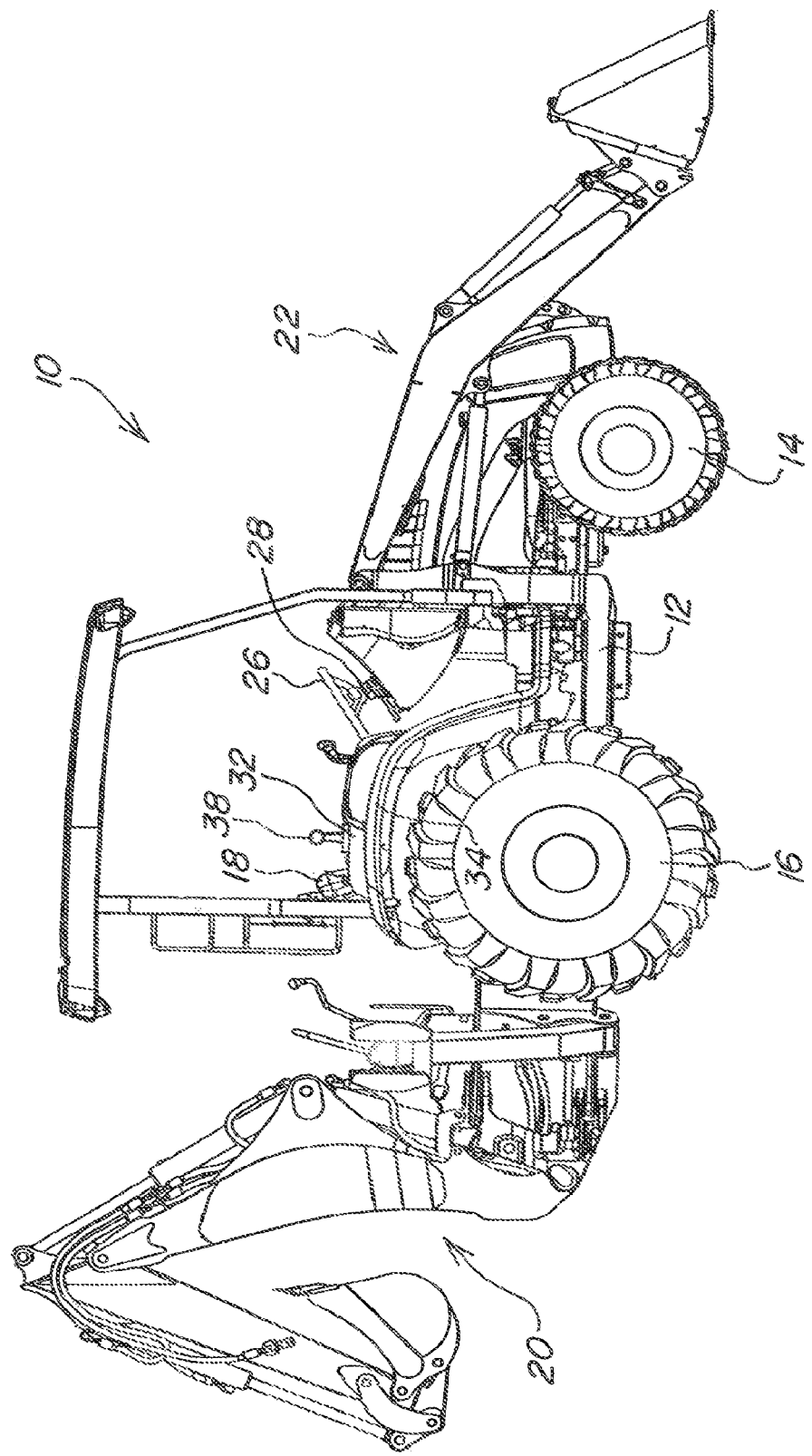
FIG. 1 is a side elevational view of a utility vehicle including a creep steering control system operable from a rearward-facing position according to an embodiment of the present invention.

FIG. 1 shows utility vehicle 10, such as a tractor-loader-backhoe, having a first embodiment of a creep steering control system operable from a rearward-facing position. The utility vehicle includes chassis 12 supported on a pair of front wheels 14 and a pair of rear wheels 16. The chassis may support forward-facing seat 18. The utility vehicle may have a rear-mounted implement such as backhoe attachment 20, and a front-mounted implement such as loader 22. Controls for forward-facing operation of the utility vehicle may be arranged, either as foot pedals, control levers or actuators, so that an operator can select the forward or reverse direction and ground speed of the utility vehicle from the forward-facing seat, and also operate the front-mounted implement. Steering wheel 26 may be pivotably mounted on steering shaft 28 positioned in front of the forward-facing seat. The steering wheel and shaft may be connected through mechanical, hydraulic or electronic steering linkages to the pair of front wheel and/or rear wheels.

Figure 3:
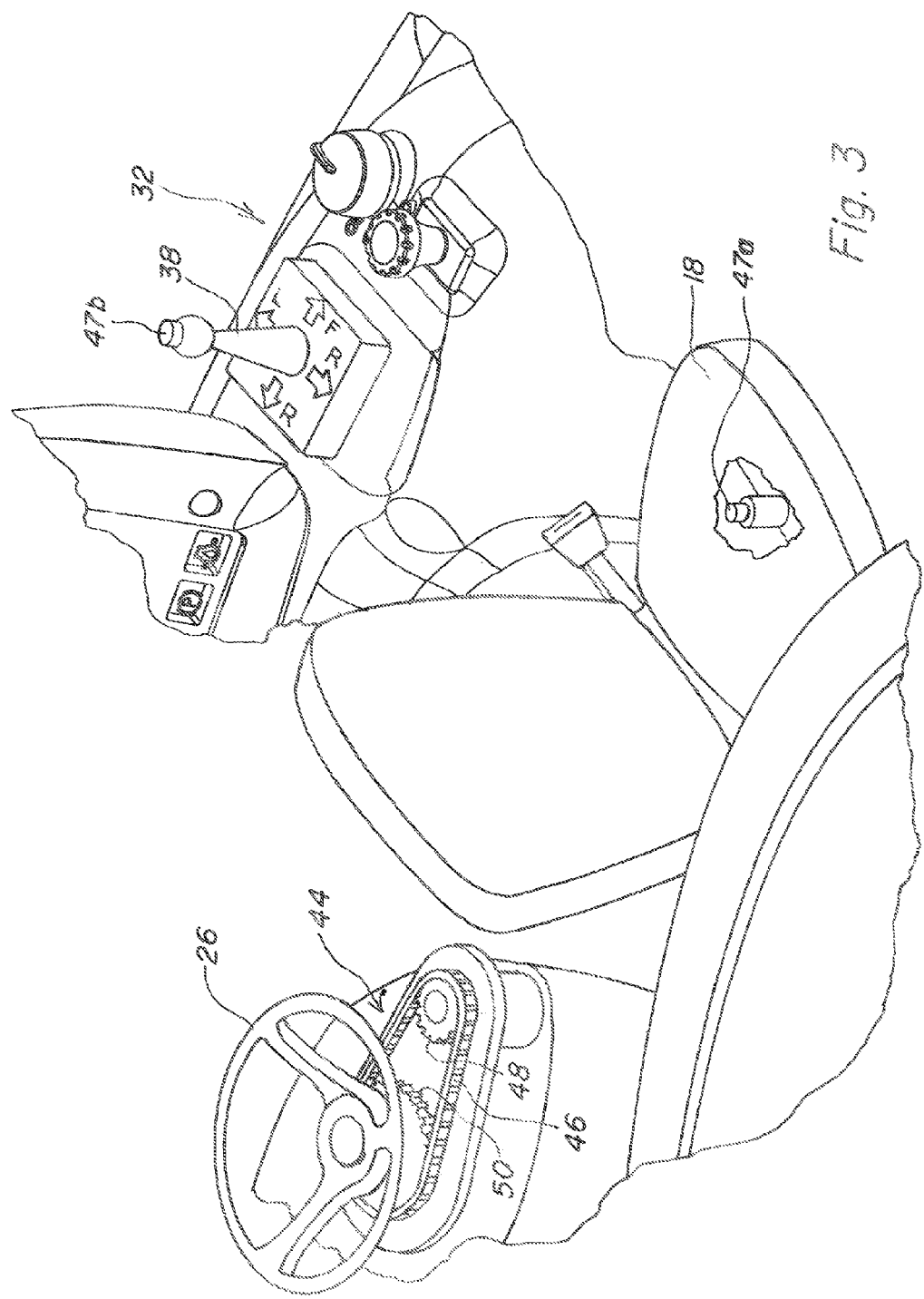
FIG. 3 is a perspective view of a utility vehicle operator station having an embodiment of the creep steering control system for a utility vehicle operable from a rearward-facing position.

In one embodiment shown in FIG. 3, forward-facing seat 18 is re-positioned to face rearwardly. For example, the operator may pivot the seat on either a horizontal or vertical axis to face rearwardly. In the rearward-facing position, steering wheel 28 is behind the seat. Operator console 32 may be positioned alongside or adjacent the rearward-facing seat, or arranged on fender 34.

Figure 2:
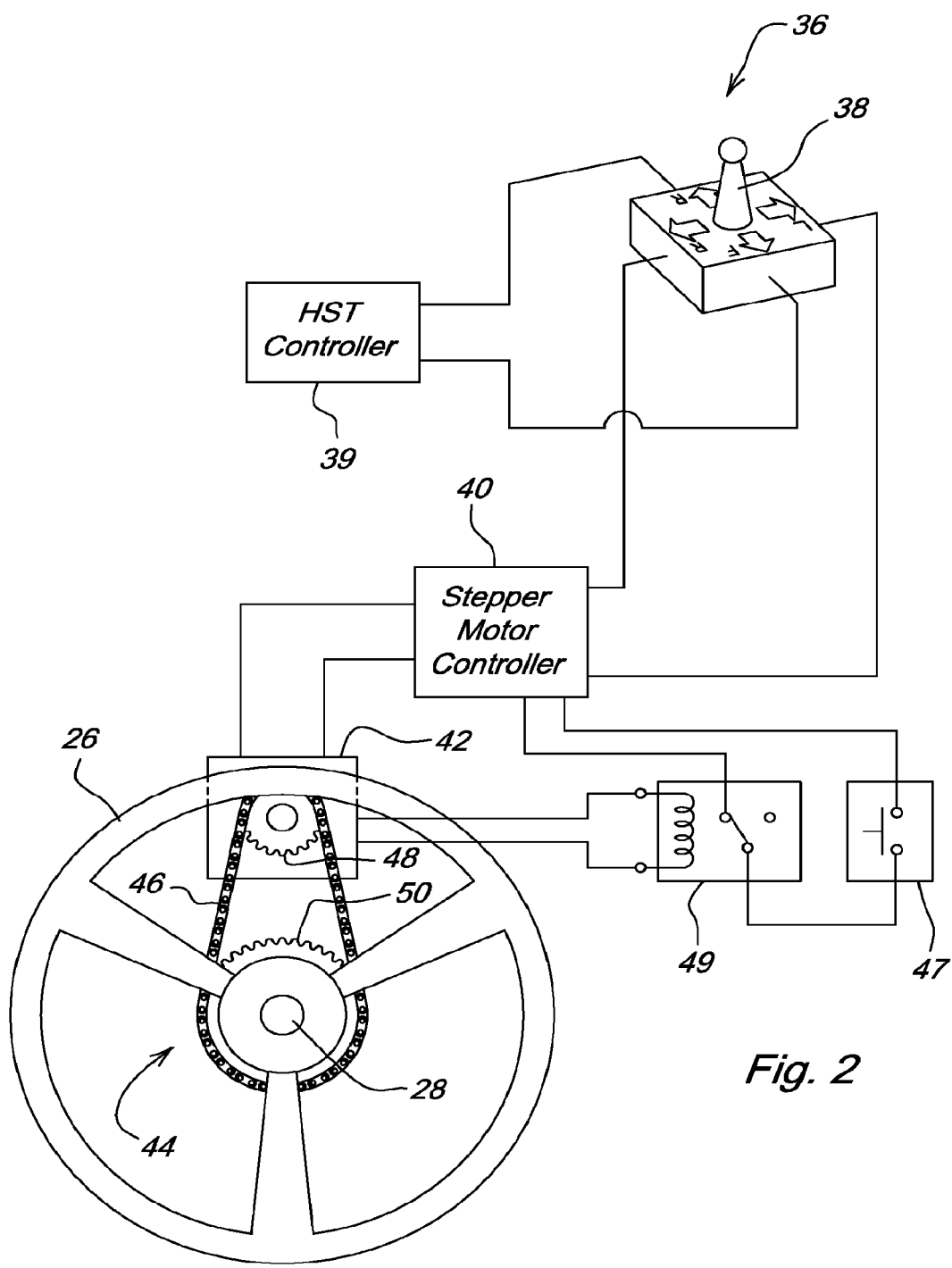
FIG. 2 is a block diagram of one embodiment of a creep steering control system for a utility vehicle operable from a rearward-facing position.

In the embodiment shown in FIGS. 2 and 3, creep steering control system 36 may include pivotable actuator 38. The pivotable actuator may be located on operator console 32 alongside or adjacent the rearward-facing seat. The operator may operate the creep steering control system with one of his hands while facing rearwardly, and while seated in the rearward-facing seat. The pivotable actuator may be a joystick that an operator can pivot or tilt with his hand to provide steering commands to the steering wheel and/or steering linkages of the utility vehicle. From the rearward-facing position, the operator also may operate a backhoe or other rear-mounted implement.

Optionally, the operator may use the same pivotable actuator to control the creep direction and/or creep speed of the vehicle. For example, the pivotable actuator may be electronically linked to hydrostatic transmission controller 39 which sends forward and reverse signals to a vehicle transmission. Thus, the pivotable actuator may be integrated with forward and reverse creep-to-reposition controls.

In one embodiment shown in FIG. 2, pivotable actuator 38 may provide steering commands to steering wheel 26 through an electronic and/or mechanical linkage. For example, the linkage may include stepper motor controller 40, stepper motor 42, and mechanical chain drive 44. The pivotable actuator may provide electrical output signals to stepper motor controller 40, which may provide electrical output signals to stepper motor 42.

In one embodiment, stepper motor controller 40 may be an open-loop stepping system that provides simple and accurate control of position and speed of the steering wheel. The stepper motor controller may be commanded by two digital inputs from the pivotable actuator: a digital pulse train and a direction bit. The stepper motor controller sends step pulses and direction signals to a 2-phase, bipolar stepping motor to allow precise motion control. Step pulses and direction signals are translated by a microstepping drive into precise movements of the stepping motor shaft. For example, the stepper motor controller may drive the stepper motor at from 0.4 to 3.5 Amps/phase, and step modes may be selected from 400 to 10,000 steps per revolution. The frequency of the pulse train controls the velocity of the motor, and the number of pulses determines the length of the move. Each pulse moves the stepper motor one step increment in the direction (CW or CCW) set by the direction bit. The stepper motor converts the power from the drive into rotational movement. The stepper motor may require a 12-42 VDC power supply and may have optically isolated digital inputs for step, direction and enable.

In one embodiment, mechanical chain drive 44 may include chain 46 that engages stepper motor sprocket 48 and steering wheel shaft sprocket 50. The stepper motor sprocket may be smaller in diameter than the steering wheel shaft sprocket, so that a larger degree turn of creep steering control sprocket 38 results in a smaller degree turn of the steering wheel shaft sprocket. For example, the stepper motor sprocket may be a twenty tooth sprocket and the steering wheel shaft sprocket may be a forty tooth sprocket. Alternatively, instead of mechanical chain drive 44, hydraulic, electrical or other mechanical linkages may be used to convey a position signal from pivotable actuator 38 to the steering wheel and/or steering linkage.

In one embodiment, the creep steering control system may include switch 47 having a first position in which creep steering control system is activated, and a second position in which the creep steering control system is deactivated. For example, as shown in FIG. 3, the switch may be an operator presence or seat switch safety interlock 47a in the suspension and/or support mechanism for seat 18. The switch may be in the first position, allowing operation of the creep steering control system, only if the seat is pivoted or moved to face rearwardly and a seated operator is detected. Alternatively or additionally, the switch may be a hand position switch 47b located on or immediately adjacent the pivotable actuator. The switch may be in the first position, allowing operation of the creep steering control system, only if the operator's hand is detected on the pivotable actuator. In the first position the creep steering control system is activated so a rearward-facing operator may use the pivotable actuator to turn the steering wheel. In the second position the creep steering control system is deactivated, the steering wheel may turn independently of the pivotable actuator, and a forward-facing operator may steer the utility vehicle in a conventional manner.

Optionally, stepper motor 42 may include an encoder that senses when the steering wheel reaches a maximum steering angle; i.e., a full left or right hand turn; and relay 49 that controls power to stepper motor controller 40. When the steering wheel is at the maximum angle, the encoder stops rotation of gear 48, and cuts off the stepper motor controller. The stepper motor controller may reset when the direction input is changed.

Having described the preferred embodiment, it will become apparent that various modifications can be made without departing from the scope of the invention as defined in the accompanying claims.

The invention claimed is:

1. A creep steering control system for a utility vehicle having a creep speed control operable from a rearward-facing position and a steering wheel operable from a forward-facing position, comprising:
    a pivotable actuator operable from the rearward-facing position;
    a linkage between the pivotable actuator and the steering wheel; and
    a switch having a first position in which the creep steering control system is activated so that the pivotable actuator turns the steering wheel, and a second position in which the creep steering control system is deactivated so that the steering wheel turns independently of the pivotable actuator.

2. The creep steering control system of claim 1 wherein the linkage is a mechanical chain drive.

3. The creep steering control system of claim 1 further comprising a stepper motor between the actuator and the steering wheel.

4. The creep steering control system of claim 1 wherein the utility vehicle has a rearward-facing seat.

5. The creep steering control system of claim 1 wherein the pivotable actuator is a joystick.

6. The creep steering control system of claim 1 wherein the pivotable actuator can change the creep drive speed of the vehicle.

7. A creep steering control system for a utility vehicle operable from a rearward-facing seat, comprising:
    a pivotable actuator alongside the rearward-facing seat and providing electronic output based on the position of the actuator;
    a stepper motor controller receiving the electronic output from the pivotable actuator and providing electronic output to a stepper motor;
    a steering wheel behind the rearward-facing seat; and
    a linkage between the stepper motor and the steering wheel for turning the steering wheel.

8. The creep steering control system of claim 7 wherein the linkage is mechanical.

9. The creep steering control system of claim 7 wherein the pivotable actuator provides electronic output based on the position of the pivotable actuator to a hydrostatic transmission controller.

10. The creep steering control system of claim 7 wherein the pivotable actuator is a joystick.

11. The creep steering control system of claim 7 further comprising a switch having a first position in which the position of the pivotable actuator turns the steering wheel, and a second position in which the position of the steering wheel turns independently of the position of the pivotable actuator.

12. A creep steering control system for a utility vehicle having a steering wheel operable from a front-facing position, comprising:
    a pivotable joystick operable from a rearward-facing position, the joystick pivotable to provide speed commands for forward and reverse movement of the vehicle, and direction commands for left and right turns of the vehicle;
    a first linkage between the pivotable joystick and a transmission controller; and
    a second linkage between the pivotable joystick and the steering wheel.

13. The creep steering control system of claim 12 wherein the second linkage includes a stepper motor controller.

14. The creep steering control system of claim 12 wherein the second linkage includes a mechanical chain drive.

15. The creep steering control system of claim 12 further comprising a switch that operates the second linkage only if an operator is detected in the rearward-facing position.

16. The creep steering control system of claim 15 wherein the switch is included in a pivotable seat.

17. The creep steering control system of claim 15 wherein the switch is an operator hand presence switch.

18. The creep steering control system of claim 12 wherein the second linkage is operable only until the steering wheel reaches a maximum steering angle.

\* \* \* \* \*